Nov. 28, 1961   F. W. LINDBLOM   3,010,364
CLIP-ON SUNGLASSES

Filed June 4, 1959   2 Sheets-Sheet 1

*INVENTOR.*
FRANK W. LINDBLOM
BY
*Barlow & Barlow*
ATTORNEYS

Nov. 28, 1961 F. W. LINDBLOM 3,010,364
CLIP-ON SUNGLASSES

Filed June 4, 1959 2 Sheets-Sheet 2

INVENTOR.
FRANK W. LINDBLOM
BY
*Barlow & Barlow*
ATTORNEYS

United States Patent Office 3,010,364
Patented Nov. 28, 1961

3,010,364
CLIP-ON SUNGLASSES
Frank W. Lindblom, Warwick, R.I., assignor to Welsh
  Manufacturing Company, a corporation of Rhode
  Island
Filed June 4, 1959, Ser. No. 818,026
2 Claims. (Cl. 88—41)

This invention relates to clip-on or auxiliary sunglasses which are designed for use with ordinary spectacles and more particularly to the method of fastening such glasses to spectacles.

It is an object of this invention to provide clip-on sunglasses which can be readily placed over ordinary spectacles without the use of any auxiliary attachment means.

A further object of the invention is to provide a pair of sunglasses which may be readily attached and detached from spectacles with the use of only one hand.

A still further object of the invention is to provide a pair of auxiliary sunglasses which have a novel clip fastening means.

A still further object of the invention is to provide a novel clip means which utilizes a single structure that has an integral spring means which may be rapidly assembled to an eye glass frame.

With these and other objects in view the invention consists of certain novel features of construction as will be more fully described and particularly pointed out in the appended claims.

Figure 1:
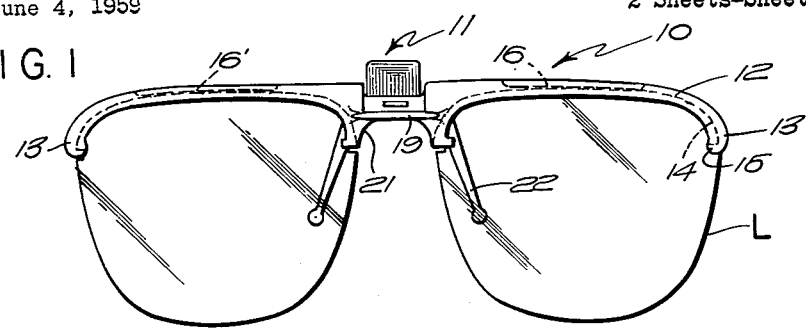
FIGURE 1 is a front elevational view of the auxiliary sunglasses made in accordance with the invention.
Figure 2:
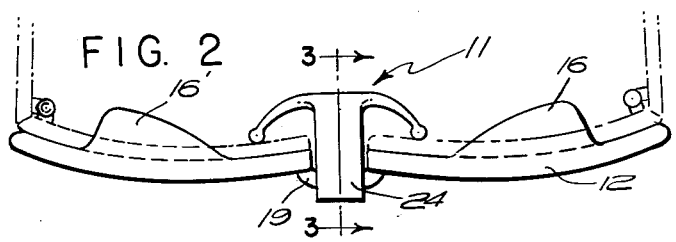
FIGURE 2 is a top view showing the auxiliary sunglasses attached to a pair of ordinary spectacles.
Figure 5:
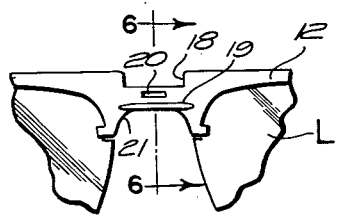
FIGURE 5 is a front view of the bridge portion only of the auxiliary sunglasses before the clip has been assembled thereto.
Figure 6:
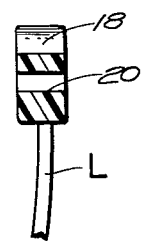
FIGURE 6 is a sectional view taken on lines 6—6 of FIG. 5.

Referring now particularly to FIGURES 1, 2 and 5, it will be seen that the sunglasses are composed of two members; namely, a frame member generally designated 10 and a clip member geenrally designated 11. The frame member comprises a unitary upper frame structure 12 which is provided with end portions 13. The underside of the frame portion is provided with a groove 14 which is adapted to receive a lens L. The manner of securing the lens to the frame is relatively unimportant in the present instance, but may comprise a projection or tit 15 at the end of the groove 14 which will engage a slot cut into the lens. The upper portion of the frame also has lips 16, 16' extending rearwardly therefrom, which lips are adapted to provide a seat permitting the frame to lie on the upper portion of the spectacles to which the auxiliary sunglasses are attached. The bridge portion of the frame 10 is characterized by a recess 18 and a forwardly extending projection 19 which provides a thumb piece to operate the clip when it is in assembled position. An aperture 20 is cut into this bridge portion for reception of the clip member and the bridge member further has a cutout portion as at 21 to give clearance for the nose of the wearer.

Figure 3:
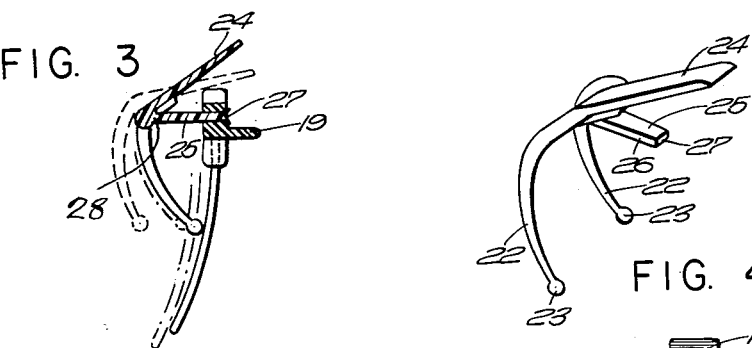
FIGURE 3 is a sectional view taken on lines 3—3 of FIG. 2.
Figure 4:
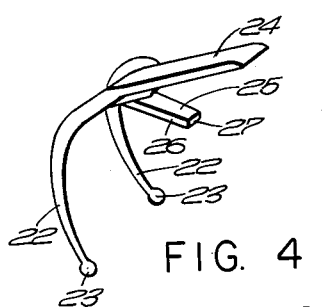
FIGURE 4 is a perspective view of the clip assembly.

The clip as shown in FIGURES 3 and 4 is provided with a pair of tines which are formed into somewhat of a wishbone shape. These tines or arms 22 have ball ends as at 23 which yield a spherical surface for contact with the spectacles. Leading from the bridge of the wishbone shaped tines 22 is a finger piece 24 and a spring finger 25, which also projects rearwardly from the same central portion of the wishbone shaped tines but at a different angle to the finger piece 24. This spring finger 25 has its edges tapered toward each other at the free end thereof and is adapted to be received within the aperture 20, the tapering edges providing a snug fit within the aperture 20. To insure that the spring finger remains within the slot 20, the end thereof, as at 27, may be welded to the frame by the application of heat or alternately other means may be utilized such as an adhesive to insure that the spring finger remains within the slot. The spring finger 25 when fastened into the aperture 20 serves as both a support for the clip 11 and as a spring which urges the tines 22 into engagement with the lenses of the primary spectacle to which the auxiliary sunglasses may be attached. Thus when pressure is applied between the finger piece 24 and the portion 19, a hinge action will first occur by deformation of the material at 28, see FIGURE 3 which is where the spring finger 25 joins the bridge between the tines 22. Upon further pressure being applied, the spring finger 25 will act as a leaf spring, but due to the inherent properties of the materials, the hinge action usually takes place first. When suitable materials are utilized for the body of the clip 11, there will be extreme resilience present in this structure, and the spring finger 25 will perform as a true elastic body which by design will not exceed the elastic limit and thus provide a return to normal position for the parts when pressure is released.

Figure 8:
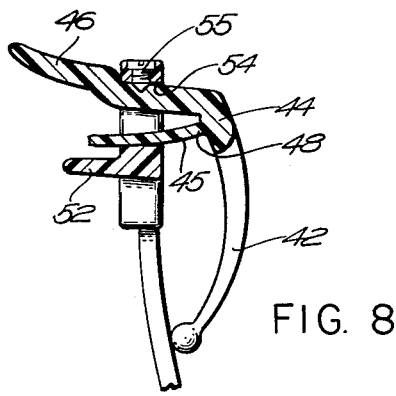
FIGURE 8 is a sectional view taken on line 8—8 of FIG. 7.
Figure 7:
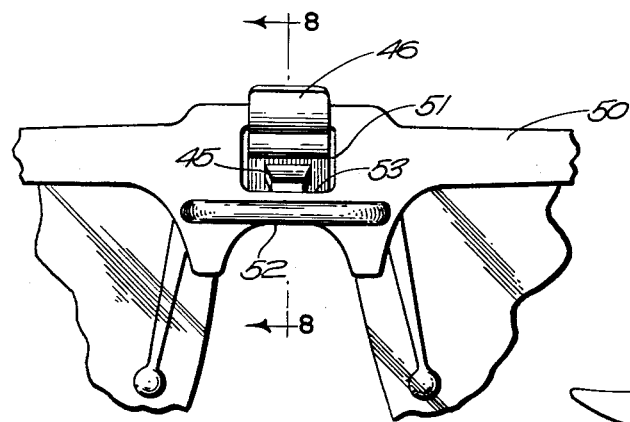
FIGURE 7 is an enlarged fragmentary front view of the bridge portion of a modified form attached to spectacles.
Figure 9:
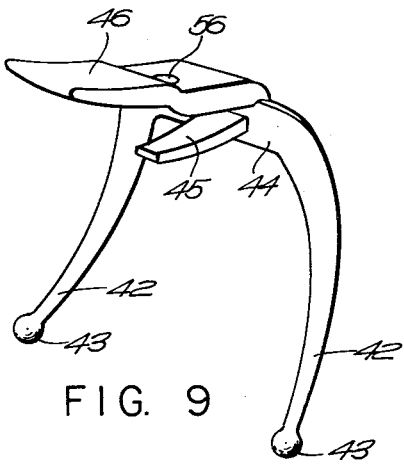
FIGURE 9 is a perspective view of the modified clip assembly.

In FIGURES 7, 8 and 9 there is shown a modification of the invention in which the same basic clip action is utilized as has been described in connection with the first embodiment; namely, that a spring finger which is a free member performs the necessary action. Referring specifically to the drawings, it will be seen that the clip which is shown in perspective in FIGURE 9 consists as before of a pair of tines 42 having ball ends 43 to provide a spherical surface for contact with the spectacles. The tines 42 are joined by a bridge portion 44 which has leading therefrom a spring finger 45 and a finger piece 46. The frame of the auxiliary sunglasses in this embodiment is slightly different particularly at the bridge portion and this frame which is designated 50 is provided in the central bridge section with a rectangular aperture 51 which aperture in the present instance is adapted to receive both the spring finger 45 and the finger piece 46. Also for cooperation with the finger piece 46 a lip projection 52 extends from the bridge portion just above the nose piece cutout as did the former projection 19. In the present instance, however, the spring finger 45 bears against the bottom wall 53 of the rectangular aperture 51 while the upper portion of the finger piece 46 bears against the upper wall 54.

In order to hold the clip in position, a pin or a screw such as 55 extends downwardly into the aperture area through the top wall 54 and thereof and is received in a mating hole or recess 56 in the upper portion of the finger piece 46. In the present instance, this member 55 is shown as a screw with a pointed end, although it will be understood that other means may be utilized such as a straight rounded pin which would be received as a sloppy fit in a hole 56 on the top of the finger piece. The purpose of this member 55 is of course to hold the clip in position within the slot 51 and it will be appreciated that the action of this clip is much the same as the action of the former clip, spring pressure being applied between the finger piece 46 at the projection 52 which pressure will first deform the spring finger 45 initially about what can be termed a hinge axis as at 48 whereupon after further pressure is applied, the entire spring finger 45 acts as a leaf spring. During this movement of the finger 46 towards the projection 52, it will be apparent that the spring finger 45 will slide along the bottom wall 53 of the aperture 51 and also the tines 42 will move outwardly, thereby permitting engagement or disengagement of the auxiliary sunglasses with the primary spectacles. In all other respects this embodiment may take the form as shown in conjunction with the FIGURES 1 and 2.

It will therefore be appreciated that there is shown herein a novel form of a clip for use with an auxiliary sunglass that may be readily attached and detached from spectacles and which because of the extreme simplicity of the parts involved, involve a minimum of molding operation and assembly operations. Still, while being of utmost simplicity, the action of the clip is extremely positive due to the use of a suitable synthetic material which exhibits the desired elastic properties.

I claim:

1. Clip-on sunglasses comprising a frame, a pair of lenses received in said frame, and frame having a bridge portion between said lenses, said bridge portion having walls defining an aperture therethrough, said aperture being generally rectangular and having four walls, a clip member, said clip member having a pair of tines, a finger piece and a spring finger extending from the tines in the same direction and at an acute angle to each other, said spring finger extending at an acute angle to the general extent of the tines and received in said aperture in an attitude to urge the lower end of the tines into contact with said lenses, whereby upon pressure being exerted on the finger piece said spring finger bends moving the ends of the tines away from such lenses.

2. Sunglasses as in claim 1 wherein the spring finger and finger piece are received between two opposite walls of said aperture, said walls extending in a plane parallel to the general extent of said frame, said finger piece having means coupled thereto for retaining the parts in the aperture whereby said spring finger bears freely for sliding movement on one of said walls of the aperture and said finger piece is forced by said spring finger against the opposite of said walls.

References Cited in the file of this patent

UNITED STATES PATENTS

| | | |
|---|---|---|
| 2,326,787 | Lorig | Aug. 17, 1943 |
| 2,516,764 | Ehlert et al. | July 25, 1950 |
| 2,584,000 | Ehlert et al. | Jan. 29, 1952 |
| 2,737,848 | Crane | Mar. 13, 1956 |